Nov. 30, 1943.　　　A. H. HANSON　　　2,335,248
APPARATUS FOR TESTING BREAKER MECHANISMS
Filed Sept. 6, 1941
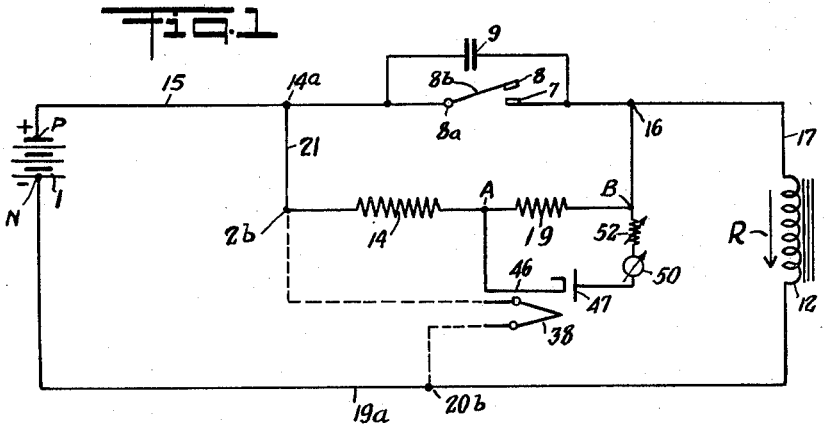
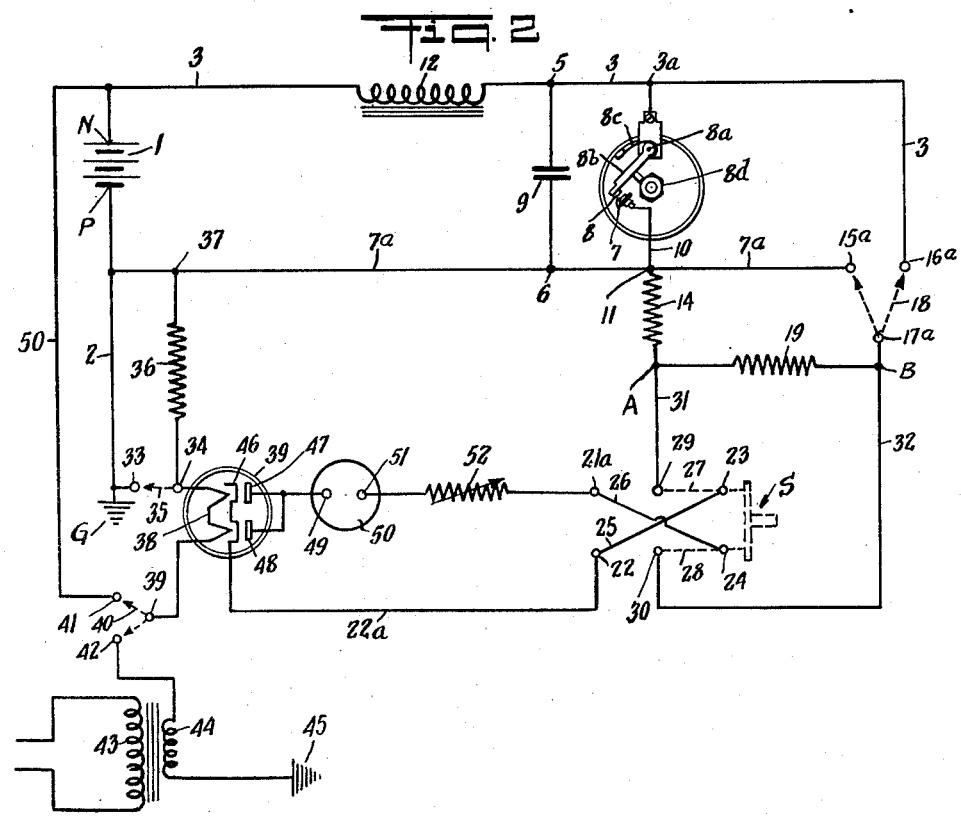
INVENTOR.
ALFRED H. HANSON
BY Max o Blum
ATTORNEYS Patented Nov. 30, 1943

2,335,248

UNITED STATES PATENT OFFICE 2,335,248

APPARATUS FOR TESTING BREAKER MECHANISMS

Alfred H. Hanson, Garrison, N. Y., assignor to Patterson O. Stewart, New York, N. Y.

Application September 6, 1941, Serial No. 409,766

8 Claims. (Cl. 177—311)

My invention relates to a new and improved device for testing and analyzing the operation of the distributor breaker-point mechanism of the ignition system of an internal combustion engine.

One of the main objects of my invention is to provide a new and improved instrument for accurately indicating the cam angle of the breaker-points of the distributor, while the engine is operating, without removing the distributor and without altering the wiring of the ignition system.

Another object of my invention is to indicate the presence of worn distributor parts which are associated with the function of the breaker-points of the distributor, such as defective breaker-springs, breaker-point resistance, defective wiring and the like.

Another object of my invention is to provide an indicator which can be used in synchronizing the cam angle of dual breaker-points.

Another object of my invention is to provide an electric meter in combination with a circuit so that the reading of the meter is unaffected by the reactance of the primary coil of the ignition system. The meter circuit is substantially non-inductive so as to permit the reading of the instantaneous current value which flows through the breaker-points.

Another object is to provide a circuit to indicate cam angle, by using an electronic vacuum tube whose filament may be heated by direct current or alternating current from any source. Said electronic vacuum tube is preferably a diode, whose cathode is heated by said filament. The cathode is insulated from the filament. The circuit does not require any plate potential.

Other objects of my invention will be stated in the following description and diagrammatic drawing.

Fig. 1 is a diagrammatic view which illustrates the principle of the improved circuit.

Fig. 2 is a more complete circuit diagram, based on the same principle.

The invention is illustrated in connection with a conventional battery ignition system for the internal combustion engine of an automobile, in which a primary coil is connected to a storage battery through breaker-means. However, the invention applies to all ignition systems which employ breaker-point mechanism. It therefore is not restricted to an ignition system which has a battery as the source of electric current and it may be applied, with slight modification, to magnetos and vibrator point dwell tests. Hence, whenever I refer to a storage battery in the description or claims, I include other suitable sources of electric current.

The principle of the invention is based upon the fact that a substantial current flow exists between the plate and the cathode of an electronic diode, even when no positive potential is applied to the plate. Upon connecting a low resistance milliammeter between the plate and the cathode, it is found that there is a space charge current of between 300–1000 microamperes, even when no positive potential is applied to the plate. This space charge current is purely electronic and it does not flow from the source of current of the filament which heats the cathode, because said heating filament is insulated from the cathode. Likewise this space charge current continues to flow as long as the cathode remains heated to the proper temperature, and even after the heating filament has been disconnected from its source of current. In effect, the diode generates a constant and individual difference of potential between the cathode and the plate, which is independent of the source of current to which the heating filament is connected. The cathode may, therefore, be heated in any suitable manner, as by means of a direct current from an ignition battery, from any suitable source of alternating current or in any other manner.

Fig. 1 shows the storage battery 1 of any ignition system for automobile engines or the like. This battery has a positive pole P and a negative pole N. The positive pole P is connected by the wire 15 to the pivot point 8a of the breaker-arm 8b, which is oscillated in the usual manner by the conventional cam (not shown). Said turnable breaker-arm 8b has the usual contact point 8. The arm 8b is biased in the usual manner by the conventional spring, to produce contact between the movable breaker-point 8, and the stationary breaker-point 7. This stationary breaker-point 7 is adjusted by conventional means. The usual ignition condenser 9 is connected in shunt across the points 7 and 8. The breaker-point 7 is connected by the wire 17 to one end of the primary coil 12 of the ignition system. The secondary coil is not shown. The other end of the primary 12 is connected by the wire 19a to the negative pole N of the battery 1. The wire 21 connects the point 14a of the wire 15 to one end of the resistance 14, whose value may be 100 ohms. Whenever specific figures are stated herein, this is only as an example and the invention is not limited thereto. The other end of the resistance 14 is connected to the point A, which is connected to the cathode 46 of the diode. The heating filament 38 of the diode is of any suitable type and it is insulated in the usual manner from the cathode 46 of the diode and also from the plate 47 of the diode. The heating filament 38 of the diode may be connected to the circuit at the points 2b and 20b, in order to draw heating current from the battery 1. As previously stated, the filament 38 may be heated in any suitable manner. The plate 47 of the diode is connected to one terminal of the milliammeter 50. The other terminal of the milliammeter 50 is connected through the adjustable resistance 52 to the point B. The points A and B are connected by the resistance 19, which may be 25 ohms. In any event, the value of the resistance 19 is less than the value of the resistance 14. Hence the resistance 19 may be referred to as the low resistance and the resistance 14 may be referred to as the high resistance. The adjustable resistance 52 is used to calibrate the milliammeter 50, in order to make full-scale adjustment in the usual manner.

The operation of the circuit illustrated in the diagram is as follows:

When the breaker-points 7 and 8 are closed, there is substantially no IR drop through the direct circuit between the points 14a and 16, because the resistance of the points 7 and 8 is substantially zero and the primary coil 12 then supplies practially all of the impedance of the circuit. Current will flow through the primary coil 12, when the breaker-points are closed.

Due to the electronic effect of the diode which has been previously mentioned, said diode maintains the point B at a higher potential than the point A. This difference of potential is much less than the voltage of the storage battery 1, which is ordinarily either 6 volts or 12 volts and even more. When the breaker points are closed, substantially no battery current will flow from point 14a to 2b, and through resistances 14 and 19 to point 16, because of the negligible resistance of the closed breaker-points. The IR drop of the battery current through the resistance 19 will be negligible when the breaker-points are closed, so that the difference of potential of point A above that of point B which is produced by the battery current will be negligible and much less than the difference of potential of point B over point A, which is produced by the diode. Hence current will flow from the plate 47 through the milliammeter 50 to the cathode 46, during each interval in which the breaker-points are closed.

Likewise, the resistances 14 and 19 are connected in parallel with respect to the electronic current of the diode when the breaker-points are closed, because said electronic current can flow from the point B to the point 16, through the closed breaker-points to the point 14A, through the wire 21 to the point 2b, and through the resistance 14 to the point A.

When the resistances 14 and 19 are thus connected in parallel, their total combined resistance between the points B and A is only 20 ohms. Hence, a pure electronic current will flow through the meter 50, during each interval in which the breaker-points are closed.

When the breaker-points 7 and 8 are open, as illustrated in Fig. 1, the resistances 14 and 19 are connected in series between the points 14 and 16 and the potential of the point A is higher than that of the point B, due to the voltage drop of the battery current across the resistance 19. This voltage drop is at least equal to and it is preferably greater than the electronic potential of the diode. Hence the electronic current will be immediately interrupted when the breaker-points 7 and 8 are open, because the cathode 46 is then at a higher potential than the plate 47.

The meter 50 will therefore indicate the total value of the current pulses which are sent through said meter, during the periods of time when the breaker-points are closed. The meter 50 is calibrated by means of the adjustable resistance 52, by closing the circuit of said meter 50 to secure full continuous current, the resistance 52 being adjusted so as to secure full-scale reading.

Therefore, the reading of the scale under test conditions, indicates the summation of a series of intermittent current pulses, which are coincident with the current pulses which are passed by the battery through the primary coil 12.

The meter 50 therefore measures the instantaneous value of the current which flows through the breaker-points and the reading of the scale of the meter 50 will exactly show the percentage of time that the battery current flows through the intermittently interrupted circuit of the primary coil 12. For example, if the reading of the meter 10 drops to one-half the calibrating reading, under test or operating conditions, this will show that current is flowing through the meter 50 and through the breaker-points, only one-half of the total time.

When the breaker-points 7 and 8 are opened, the inductance of the primary coil 12 tends to maintain the flow of current through said coil 12, in the direction of the arrow R. This direction is the same as the direction of the current through said coil 12, when the breaker-points are closed. However, this reactance current cannot flow through the meter 50 because the resultant voltage makes the point A of higher potential than the point B, so that the cathode 46 has a higher potential than the plate 57.

The meter 50 is thus automatically disconnected from the circuit of the primary coil 12, during the intervals in which the breaker-points 7 and 8 are separated.

In addition, when the breaker-points 7 and 8 are separated, the condenser 9 is charged to saturation by the self-induced voltage of the primary coil 12. The condenser 9 will discharge through the battery 1 and through the resistances 14 and 9 and through the primary coil 12. However, as the direction of this discharge current maintains the point A and the cathode 46 of higher potential than the point B and the plate 47, this current will not pass through the milliammeter 50. Although the reactance effect of the primary coil 12 produces successive alternations of current flow, which would tend to make the point B and the plate 47 of higher potential than the point A and the cathode 46, this disturbing factor is not of sufficient magnitude to affect the result which is secured by the steady flow of direct current from the battery 1, through the resistance 19. Resistances 14 and 19 also decidedly dampen the oscillations of the condenser 9.

The invention is especially useful in accurately testing the operation of the breaker-points 7 and 8 during the actual running of the engine of the automobile or the like. If the points 7 and 8 are set by a thickness gauge or synchrograph, the setting of the breaker-points 7 and 8 may be changed during the operation of the engine, due to thrust conditions.

According to my invention, the operator can thus measure the cam angle under actual operating conditions, so as to compensate for the effects of centrifugal force and of inherent thrust conditions. On the contrary, if the breaker-points are adjusted by a synchrograph, the cam angle setting may change under operating conditions.

Tests have shown that if the primary coil 12 is replaced by a non-inductive resistance, the reading of the meter 50 remains substantially the same, if the resistance of the substituted coil is equal to the pure resistance of the primary coil 12. This shows that the reactance of the primary coil has no effect upon the reading of the meter 50, under operating conditions. If current is supplied to the heating filament 38 from any suitable source of alternating current or by a battery which is external to the ignition system, the full-scale setting of the meter 50 is unaffected by the voltage of the ignition battery 1 of the automobile. Therefore one setting of the meter 50 can be made prior to the actual testing, by adjusting the resistance 52, and this calibration remains constant throughout the test, independently of the voltage of the battery 1, the action of the generator of the ignition system, etc.

If the heating current of the filament 38 is supplied by the battery 1 of the ignition system, the temperature of the filament 38 will vary with the action of the generator of the ignition system, thus affecting the full-scale setting or calibration of the meter 50. It is possible, but not desirable, to include a ballast resistance in the filament circuit so that it is unnecessary to make more than a single initial adjustment of the calibrating resistance 52. However, if the battery current is used for heating the filament 38, the simplest method is to make an accurate adjustment of the resistance 52, prior to making each test of cam angle or the degrees of dwell.

In the circuit of Fig. 2, the positive pole P of the battery 1 is grounded at G through the wire 2, since it is conventional to ground one terminal of the ignition battery of an automobile. In the majority of cases, the positive pole is grounded, but in some cases the negative pole N may be grounded, so that I have provided a polarity switch S. The setting of this polarity switch S, which is shown in Fig. 2, corresponds to the grounding of the positive pole P of the battery 1. The positive pole P is connected through the wire 7a to the point 6, which is connected by the condenser 9 to the point 5. The primary coil 12 is connected between the point 5 and the negative pole N, by means of the wire 3. The positive pole P is connected by the wire 2 to the terminal 33 of a switch which has a movable switch arm 35, which is turnably or otherwise movably connected to the terminal 34. If the battery 1 is a six-volt battery, the switch arm 35 is moved by the operator to connect the terminals 33 and 34, so as to cut out the resistance 36, which connects the terminal 34 to the point 37. If the battery 1 is a twelve-volt battery, the switch arm 35 is moved to a circuit-opening position so that the heating current of the filament 38 passes through the resistance 36, when the switch arm 35 is moved to the circuit-opening position. The negative pole N is also connected by a wire 50 to the terminal 41 of a switch which has another terminal 39 and a manually operable switch arm 40. When the filament 38 is to be heated by the battery current, the switch arm 40 is moved to connect the terminals 41 and 39.

If the filament 38 is to be heated by an alternating current, the switch arm is moved by the operator to connect the terminals 39 and 42. The secondary coil 44 of a transformer has one end thereof connected to the terminal 42, and the other end thereof is grounded at 45. This secondary coil 44 is inductively coupled to the primary coil 43 of a transformer, which is connected to any suitable source of alternating current. When the filament 38 is heated by alternating current, the switch arm 35 is moved to connect the terminals 33 and 34, so as to ground one end of the filament 38 at G. The heating transformer is a step-down transformer, if ordinary commercial alternating current is supplied to the primary coil 43. The point 3a of the wire 3 is connected to the movable breaker-arm 8b which is pivotally mounted at 8a in the usual manner. The conventional spring 8c biases the arm 8b to the position in which the points 7 and 8 will contact with each other.

Fig. 2 also illustrates the conventional cam 8d which rapidly oscillates the arm 8b, so as to make and break the circuit. A stationary but adjustable point 7 is connected to the point 11 of the wire 7, by means of the wire 10. The point 11 of Fig. 2 corresponds to the point 14a of Fig. 1. The points 11 and A are connected by the resistance 14, which preferably has a value of 100 ohms, as in the preceding example. The points A and B are connected by a resistance 19, which also preferably has a value of 25 ohms, as in the preceding example. The point B is connected to the terminal 17a and said terminal 17a can be connected either to the test terminal 16a, or to the set terminal 15a, by means of the manually operated switch arm 18. The terminals 17a and 16a are connected when the ignition system of the engine is being tested under actual operating conditions. The point A is connected to the terminal 29 of the polarity switch S by the wire 31. The point B is connected to the terminal 30 of the polarity switch S by the wire 32. The terminals 29 and 23 are connected by the blade 27 of the movable arm of the polarity switch, and the terminals 30 and 24 are connected by the blade 28 of said movable arm, when said movable arm is in the position of Fig. 2. The blades 27 and 28 are respectively pivotally mounted at the terminals 29 and 30, in the conventional manner. The terminal 23 is connected to the terminal 22 by the wire 25 and the terminal 24 is connected to the terminal 21a by the wire 26. The cathode 46 is connected to the terminal 22 by the wire 22a. In the circuit of Fig. 2, the diode 39 is provided with two plates 47 and 48, as in a full-wave rectifier, and these plates are connected to the terminal 49 of the milliammeter 50. The terminal 51 of the milliammeter 50 is connected through the adjustable resistance 52 to the terminal 21a.

Assuming that the switch arm 18 connects the terminals 16a and 17a, it is clear that the operation of the circuit of Fig. 2 is substantially the same as the circuit of Fig. 1. When the breaker-points 7 and 8 are closed, current will flow from the positive pole P through the wire 7a to the point 11, through the wire 10 to the fixed breaker-point 7, through the breaker-point 8 and the breaker-arm 8b to the terminal 8a, and to the point 3a of the wire 3 so that the circuit is closed through the primary coil 12.

Current will then also flow from the point 11 through the resistance 14 to the point A, through the resistance 19 to the point B, to the terminal 17a, through the switch arm 18 to the point 16a and back through the wire 3 and the primary coil 12 to the negative pole N.

However, for the reasons previously explained, the resistances 14 and 19 are then connected in shunt with respect to the electronic current of the diode 39. Current will therefore flow from the plates 47 and 48 through the milliammeter 50, through the resistance 52 to the terminal 21a, through the wire 26 to the terminal 24, through the blade 28 to the terminal 30, through the wire 32 to the point B, through the resistance 19 to the point A, through the wire 31 to the terminal 29, through the arm 27 to the terminal 23, through the wire 25 to the terminal 22, and through the wire 22a to the cathode 46.

When the breaker-points 7 and 8 are open, the battery current will flow from the positive pole P through the resistances 14 and 19 (now arranged in series) and through the switch arm 18 to the negative pole N. The flow of the electronic current of the diode 39 will therefore be interrupted during the successive intervals in which the breaker-points are open. The actual value of the resistance 52 is about 1500 ohms.

In order to set or calibrate the meter 50, the switch arm 18 is moved to connect the terminals 15a and 17a, while the engine is operated at the test speed if the battery current is used to heat the filament. If the filament is heated by a source of alternating current or by an external battery, the engine can be run at any speed during the calibration. Referring to Fig. 1, the effect is the same as though point B were directly connected to point 14a, instead of being connected to point 16. Due to the reasons previously explained, the electronic current of the diode 39 will then flow continuously through the milliammeter 50 when the breaker-points are open and when they are closed. The resistance 52 is then adjusted in order to secure full-scale reading with said continuous electronic current. This electronic current through the meter 50 may vary from about 0-600 microamperes, depending upon the temperature of the cathode.

The operation of the diode 39 does not depend upon any passage of current between the filament 38 and the plate or plates of the diode. This can be demonstrated by disconnecting the filament wholly from the heating circuit, because the circuit will then operate in the manner above mentioned, as long as the cathode 46 is sufficiently hot to emit electrons.

The output voltage of the generator of the ignition system of an automobile varies with the speed of the automobile engine. It is therefore desirable to maintain the speed of the engine constant during the test and to reset or recalibrate the meter 50 for each different speed of the engine at which the cam angle is to be tested. It is also desirable to turn on the lights of the engine during the testing, as this helps to stabilize the voltage. However, by heating the cathode 46 independently of the battery 1, many or all of these factors can be eliminated.

According to the improved circuit, the voltage of the source of ignition current is used to bias the electronic source of current, so that the current of the electronic source is absolutely interrupted when the circuit of the primary coil is open. The invention is not limited to this preferred embodiment, because the current from the electronic source may be discontinued in any manner when the circuit of the primary coil is open. Likewise, the invention includes a circuit whereby the current of the electronic source through the meter is diminished, instead of being absolutely interrupted, while the circuit of the primary coil is closed, since absolute interruption is 100% diminution.

Likewise, the invention is not limited to an ignition system in which the source of ignition current is a battery. The function of the battery and primary coil is to produce a current of sufficient potential to discharge through the points of the spark plug, and said discharge current may be secured in any suitable manner.

The improved test and calibration circuit of Fig. 2 can be conveniently embodied in an instrument which includes the resistors 36, 14, 19, the polarity switch S, the diode 39, meter 50, adjustable resistor 52, the switches which have the arms 35 and 40, and the heating transformer.

The instrument can be used by connecting one end of each of the resistors 36 and 14 to the positive pole P of the battery, and by connecting the terminals 33 and 41 of the instrument respectively to the positive pole P, by connecting the terminal 15a of the instrument to the positive pole P, and by connecting the terminal 16a of the instrument to the negative pole N. The instrument can thus be conveniently applied to or detached from the ignition system of an internal combustion engine.

I have shown a preferred embodiment of my invention, but it is clear that numerous changes and omissions can be made without departing from its spirit.

While the use of a pair of resistors 14 and 19 is preferred, the resistance 14 may be omitted, and the resistances of resistors 14 and 19 may have any desired relation, instead of having the resistance of 14 exceed that of 19. Referring to Fig. 1, if the resistance 14 is omitted, the IR drop through resistance 19 will be sufficient to block the current from the diode, when the breaker-points are open. When the breaker-points are closed, the IR drop between points 14a and 16 through the closed breaker-points is negligible, and hence the IR drop through resistance 19 will be insufficient to block the current of the diode.

However, it is preferred to use the two resistances 14 and 19, or to make the A. C. reactance of element 14 exceed that of element 19, in order to secure best result.

When the breaker-points are opened, the reactance of the primary coil can produce a reactance voltage in the order of 300–500 volts, and such reactance voltage tends to produce a high current flow for a very short fraction of a second. If the resistance 14 were omitted, leaving only the low resistance 19, the reactance voltage would be substantially short-circuited, so that the instrument would seriously affect the normal operation of the coil. By using a sufficiently high resistance 14, the coil 12 functions normally. Instead of being a pure or non-inductive resistance, the element 14 could be a coil with low direct current resistance (about 10 ohms) and with sufficient inductance so as to have a higher reactance than the non-inductive resistance 19.

It will be noted that the diode is not connected in parallel to the battery with the primary coil 12, because no battery current can ever flow through the diode.

The meter 50 is preferably a direct-current meter, which will indicate the current only when the current flows through said meter in a predetermined direction. However, I can use any type of current-measuring device. Likewise, I can use any source of electronic current.

I claim:

1. In combination with the battery and breaker-points of an ignition system which has a primary coil connected in series between the breaker-points so that the circuit of the primary coil is made and broken by the contact and separation of said breaker-points, said system also having means for successively contacting and separating said breaker-points, a shunt circuit which has its ends connected across the breaker-points so that the full battery current flows through said shunt circuit when the breaker-points are opened, said shunt circuit including a resistor, an electronic source of current which has a cathode and a plate and which is adapted to generate current at a predetermined voltage when the cathode is heated, said predetermined voltage being less than the battery voltage and being less than the IR drop of the battery current through said resistor when the breaker-points are separated, the resistance of the contacting breaker-points being sufficiently less than the resistance of said resistor so that the IR drop of the battery current in said resistor is less than said predetermined voltage when the breaker-points are in contact, said plate being connected to one end of said resistor, said cathode being connected to the other end of said resistor, the first-mentioned end of said resistor being of lower potential than the second-mentioned end when battery current flows through said resistor.

2. A combination according to claim 1, in which the shunt circuit has a second resistor which is located anterior to and which has greater resistance than the first-mentioned resistor.

3. A combination according to claim 1, in which a source of heating electric current is connected to said electronic source to heat the cathode thereof, said source of heating electric current being independent of the latter.

4. A combination according to claim 1, in which a source of heating electric current is connected to said electronic source to heat the cathode thereof, said source of heating electric current being independent of the latter, said source of heating electric current being a source of alternating current.

5. A test instrument for testing a system which has periodically separated breaker-points, which comprises a source of electronic current which has a positive terminal and a negative terminal, said instrument also comprising a first resistor and a second resistor and also comprising a current-measuring device, the first resistor having greater resistance than the second resistor, said resistors having respective proximate ends which are connected to each other, said resistors also having respective remote ends, means adapted to connect said respective remote ends to the circuit which is to be tested and in shunt across said breaker-points, the positive terminal of said source of electronic current being connected to the remote end of said second resistor through said current-measuring device, the negative terminal of said source of electronic current being connected to said resistors at their proximate ends, so that the current of said source of electronic current is urged to flow in parallel through said resistors when the circuit between said remote ends is completed.

6. A test instrument according to claim 5, in which said source of electronic current has a cathode and an anode, and means for heating the cathode to electron-emitting temperature by means of alternating current.

7. Means for testing a circuit which has a source of unidirectional current and terminals which are alternately contacted and separated so as to successively make and break said current, said means comprising a shunt circuit across said terminals, said shunt circuit having an impedance, a sub-circuit whose ends are connected to said shunt circuit, said impedance being located between the ends of said sub-circuit so that said impedance common to said shunt circuit and said sub-circuit, a diode located in said sub-circuit, said diode having a heated electron-emitting cathode and an anode, said diode being the only source of current in said sub-circuit, an electric meter located in said sub-circuit, said diode delivering a unidirectional current whose direction through said impedance is opposed to the direction of the current of the first-mentioned source through said impedance, the voltage difference which is impressed by said diode upon said impedance being greater than the opposed voltage difference which is impressed by said first-mentioned source when said first-mentioned circuit is closed, the voltage difference which is impressed by said diode upon said impedance being less than the opposed voltage difference which is impressed by said first-mentioned source when said first mentioned circuit is open, said diode blocking the passage of current from said first mentioned source through said sub-circuit when the first-mentioned circuit is open and closed, said meter receiving current only from said diode and only when said first-mentioned circuit is closed.

8. Means according to claim 7 in which said shunt circuit has an additional impedance which is located anterior to said common impedance, the value of said anterior impedance exceeding the value of said common impedance.

ALFRED H. HANSON.